United States Patent

[11] 3,582,791

[72] Inventors Michael Slavin
Towson;
Peter Manson, St. Clair, both of
[21] Appl. No. 783,060
[22] Filed Dec. 11, 1968
[45] Patented June 1, 1971
[73] Assignee The Bendix Corporation

[54] ANTENNA COUPLING AND TUNING CIRCUIT
7 Claims, 1 Drawing Fig.

[52] U.S. Cl. .......... 325/381, 325/318, 325/373, 325/387
[51] Int. Cl. .......... H04b 1/18
[50] Field of Search .......... 325/318, 319, 365, 368, 373, 374, 375, 376, 381, 387, 383, 315—317

[56] References Cited

UNITED STATES PATENTS

| | | | |
|---|---|---|---|
| 3,072,849 | 1/1963 | Firestone .......... | 325/319 |
| 3,098,973 | 7/1963 | Wickersham, Jr. et al. .. | 325/375 |
| 3,386,033 | 5/1968 | Copeland et al. .......... | 325/373 |

*Primary Examiner*—Robert L. Richardson
*Attorneys*—Plante, Arens, Hartz, Hix and Smith, Bruce L. Lamb, William G. Christoforo and Lester L. Hallacher

ABSTRACT: A circuit for coupling an antenna to the input circuit of a radio receiver is described. The inventive circuit is particularly useful with the whip type of antenna ordinarily employed with mobile vehicles having AM and/or FM radio receivers. A field effect transistor is placed in the signal received by the antenna is coupled to the input circuit through the FET. For this reason, changing the length of the antenna has no effect on the tuning of the circuit. Coupling to the RF amplifier of the receiver is done by means of a unique coupling including a complex reactance circuit. The circuit is voltage tuned by the use of a voltage sensitive capacitor.

PATENTED JUN 1 1971 3,582,791
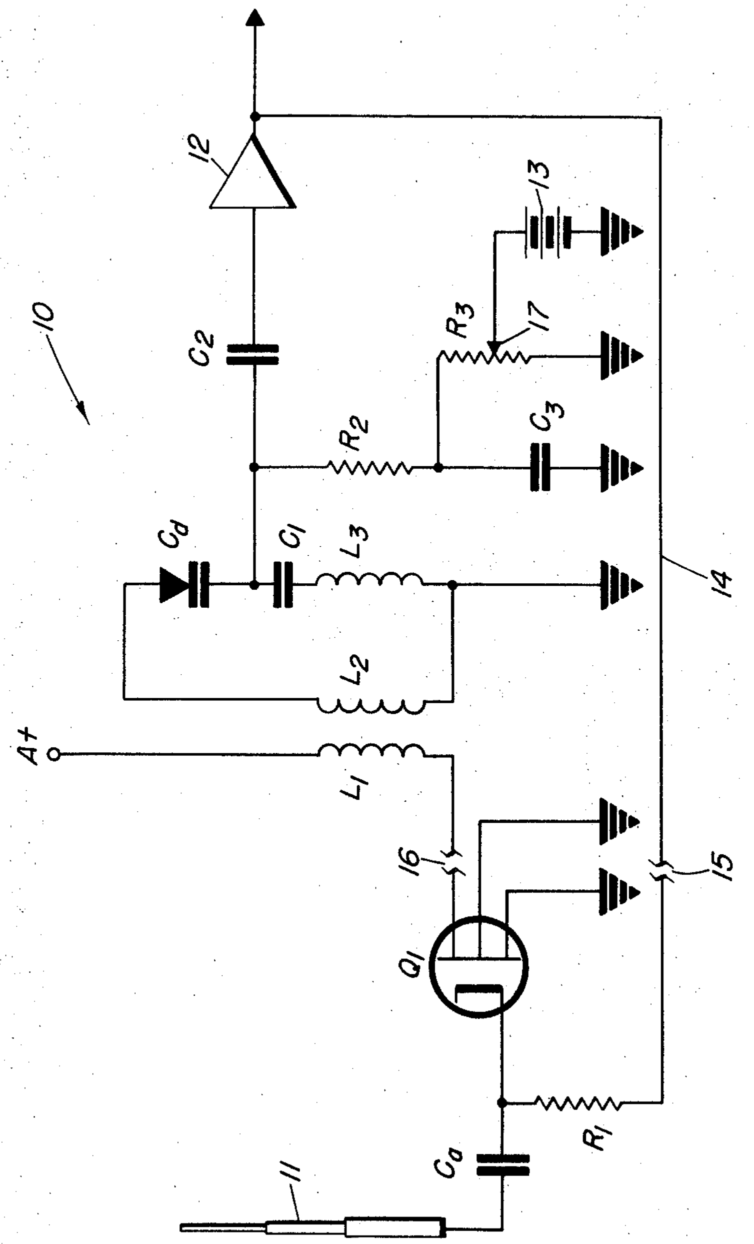
INVENTORS
Peter St. C. Manson
Michael Slavin
BY Lester L Hallacher
ATTORNEY

ANTENNA COUPLING AND TUNING CIRCUIT

It is well known that radio receivers require an antenna and that the impedance characteristics of the antenna affects the operation of the circuit it feeds. It is also well known that an antenna which is tuned over a frequency range cannot present a constant impedance over the entire range. Conversely, if the antenna is held electrically and physically constant and the receiver is tuned an impedance mismatch occurs. Both these conditions are undesirable and their elimination is therefore necessary.

These problems exist in mobile vehicles containing radio receivers utilizing a whip antenna which is telescopically constructed so that its length can be readily adjusted. As the antenna length is changed the capacitance of the antenna also changes. This change in capacitance results in a detuning of the radio receiver. The problem is amplified by the large capacitance of the input cable which connects the antenna to the receiver tuning circuit. Such capacitance must be accurately determined and considered when choosing components in the tuning circuit.

The tuning of the receiver also presents a problem because of these capacitances. This is particularly true of receivers which have a wide bandwidth. This requirement increases the difficulty arising from antenna capacitance changes as the antenna is adjusted in length and also magnifies the disadvantage of the connecting cable.

These disadvantages are overcome by the inventive circuit which includes a field effect transistor in the base of the antenna. The antenna is therefore isolated from the tuning circuit and its effect upon the characteristics of the tuning circuit are minimized. Location of the FET in the antenna base also eliminates the need for a coax cable to the tuning cable and therefore greatly reduces the capacitance which is ordinarily presented thereby. This also greatly minimizes the cross modulation which is frequently found in radio receivers. The bandwidth of the tuning circuit is increased by the use of a voltage tuned element and also by the use of a unique scheme for coupling to the first amplifier stage of the receiver.

It is therefore an object of this invention to provide a scheme for coupling an antenna to a radio receiver in a manner substantially isolating the tuning circuit of the receiver from the capacitance of the antenna.

It is another object to provide such a scheme which substantially reduces signal losses occasioned by the capacitance in the input cable.

It is another object to provide such a scheme which yields a signal-to-noise ratio which is comparable to currently available radio tuning and coupling circuits.

It is another object to provide such a scheme which substantially reduces cross modulation.

It is another object to provide such a scheme in which a change of the antenna length does not detune the antenna circuit.

It is another object to provide such a scheme which includes a unique system for coupling the tuning circuit to the first amplifier stage.

It is another object to provide a scheme which includes a voltage tuned element for tuning the frequency response of the coupling circuit.

It is another object to provide such a scheme which is useful with both AM and FM receivers.

Further objects, features and advantages of the invention will become apparent from the following description and claims when read in view of the accompanying drawings, wherein like numbers indicate like parts and in which:

The FIGURE shows a preferred embodiment of the inventive concept.

In the FIGURE the inventive circuit is indicated generally by referenced numeral 10. An Antenna 11, which is constructed such that it, can be telescopically adjusted in length, feeds a field effect Transistor $Q_1$ through Capacitor $C_a$. Capacitor $C_a$ represents the capacitance of the antenna and therefore varies as the length of the Antenna 11 is adjusted. The output of Transistor $Q_1$ is fed to an Inductor $L_1$. The curved Lines 16 are used to illustrate the fact that the Transistor $Q_1$ can be remotely located from the Inductor $L_1$ and the rest of the circuitry. The signal present on Inductor $L_1$ is inductively coupled to a second Inductor $L_2$ which is in parallel with the serial combination of a voltage tuned capacitor $C_d$, a Fixed Capacitor $C_1$ and a Third Inductor $L_3$. Capacitor $C_d$ is a varactor which is an element, capacitance varies proportionally to a DC input voltage supplied thereto. This DC voltage is supplied from a Battery 13 through the Arm 17 of a variable Resistor $R_3$. The voltage applied to varactor $C_d$ from Battery 13 can obviously be adjusted by sliding Arm 17 up and down Resistor $R_3$.

The output of the tuning circuit is taken from the junction of Capacitors $C_d$ and $C_1$. This signal is fed to the first Amplifier Stage 12 of the radio receiver through a Coupling Capacitor $C_2$. The output of Amplifier 12 is fed back to the control electrode of Transistor $Q_1$ through a Resistor $R_1$ by Line 14. This voltage is used as an automatic gain control for the amplifying Transistor $Q_1$. The curve lines 15 are again used to illustrate the remote location of Transistor $Q_1$ from the remaining elements of the circuit.

The signal received on Antenna 11 is amplified in FET $Q_1$ and fed to the low impedance Inductor $L_1$. Because the inductance of Coil $L_1$ is low there is a minimum of phase shift occasioned thereby. The tuning circuit is composed of the Inductor $L_2$ in parallel with the serial combination of Capacitors $D_d$, $C_1$ and Inductor $L_3$. The resonant frequency of the tuned circuit can be varied by varying the capacitance of Capacitor $C_d$. This is accomplished by changing the voltage input thereto from Battery 13 and Resistor $R_3$.

Because the Field Effect Transistor $Q_1$ is located directly at the base of Antenna 11, the Capacitance $C_a$ of the antenna is isolated from the other portions of the circuit. Consequently, the adjustment of the antenna height is ineffective in detuning the frequency selecting circuit of the receiver. Also, the remote location of the Transistor $Q_1$ eliminates the necessity of coupling Antenna 11 to the other circuitry by use of the coax cable, thereby permitting the use of ordinary conductors. This substantially decreases the capacitance of the input cable and substantially increases the operational characteristics of the receiver.

The coupling circuit composed of Capacitors $C_d$, $C_1$ and Inductor $L_3$ is also unique. If the circuit is tuned across the AM band by adjusting the input from Battery 13, the capacitive reactance of Capacitor $C_d$ will change in a 9 to 1 ratio. The gain across the coupling circuit will vary in the same ratio. If the output is then taken across Inductor $L_3$ only, the gain taken therefrom will vary in the same ratio as the gain across the entire circuit. However, if the output is taken across Capacitor $C_1$ only, the output gain will vary drastically because of the serial connection of Capacitors $C_d$ and $C_1$. In either of these conditions the coupling circuit is ineffective for a radio receiver utilizing If, on the other hand, the output of the coupling circuit is taken, in accordance with the instant invention, from the junction of capacitors $C_1$ and $C_d$, an essentially constant gain characteristic will be obtained. As signal frequency increases, the reactance presented by inductor $L_3$ increases and the reactance presented by capacitor $C_1$ decreases. At high frequencies, therefore, the impedance presented by the network comprising $C_1$ and $L_3$ is essentially determined by $L_3$. At low frequencies, the impedance presented by the network is essentially determined by $C_1$. As is known in the art, the gain slope characteristic produced by inductors $L_1$ and $L_2$ may be represented by the ratio 1:3 while the gain slope characteristic produced by varactor $C_d$ is represented by the ratio 9:1 as indicated above. The network comprising $C_1$ and $L_3$ serves to correct the gain slop characteristic of the circuit as a whole so that the gain slope between the output of $Q_1$ and the input of $C_2$ is essentially 1:1.

We claim:

1. An antenna circuit for use with an antenna and a receiver comprising: an electron control device situated in the proximity of said antenna and receiving an input therefrom, the output of said electron control device being coupled to said tuning circuit by coupling means, said tuning circuit being remotely situated with respect to said antenna, said coupling means being magnetic coupling means including first and second inductive elements; said tuning circuit further including voltage sensitive reactance means for tuning said circuit to a desired frequency, a first terminal of said voltage sensitive reactance means being connected to a first terminal of said second inductive element; and frequency variable reactance means connected between a second terminal of said voltage sensitive reactance means and a second terminal of said second inductive element to form a resonant circuit including said second inductive element, said voltage sensitive reactance means and said frequency variable reactance means.

2. The antenna tuning circuit of claim 1 wherein said electron control means is a field effect transistor which isolates said tuning circuit from capacitance change of said antenna.

3. The antenna tuning circuit of claim 1 further including means for coupling an automatic gain control signal to the input of said electron control device.

4. The antenna tuning circuit of claim 3 further including a variable voltage source associated with said voltage sensitive reactance element to selectively change the reactance thereof.

5. The antenna tuning circuit of claim 4 wherein said voltage sensitive reactance element is a capacitive element the capacitance of which varies proportionally to the variance of said variable voltage source.

6. The antenna tuning circuit of claim 5 wherein said frequency variable reactance means includes the serial combination of a fixed capacitor and a fixed inductor, said serial combination being serially connected to said capacitive element.

7. The antenna tuning circuit of claim 6 wherein the output from said tuning circuit is taken from the junction of said capacitive element and said series combinations.